No. 857,758. PATENTED JUNE 25, 1907.
W. H. REISNER.
NOSE GUARD.
APPLICATION FILED APR. 26, 1904.
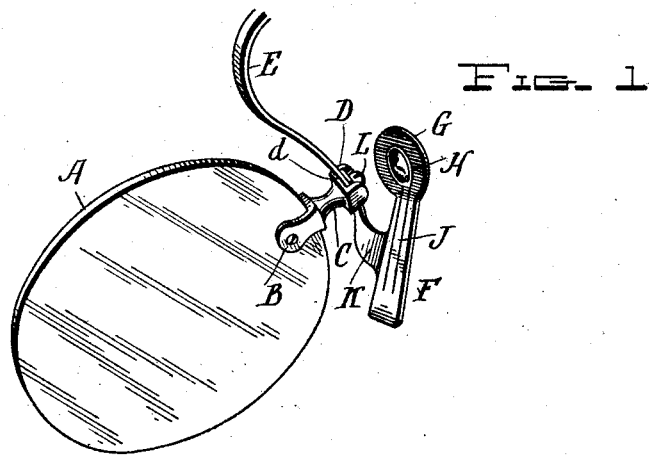
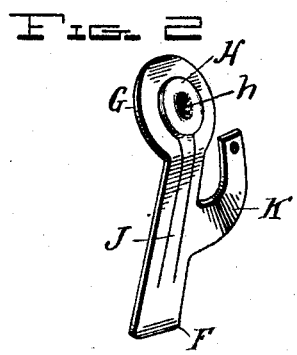
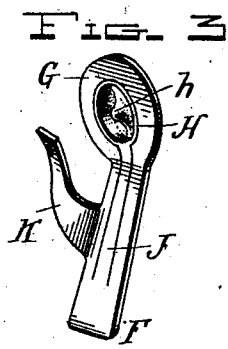
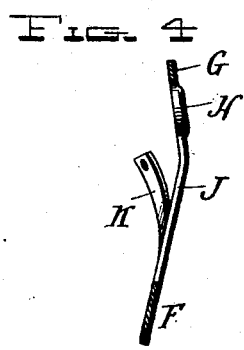
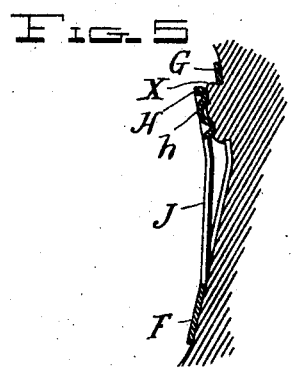
Witnesses
Inventor
William H. Reisner
Edwin Guthrie
Attorney

UNITED STATES PATENT OFFICE.

WILLIAM H. REISNER, OF HAGERSTOWN, MARYLAND, ASSIGNOR TO W. H. REISNER MANUFACTURING COMPANY, A CORPORATION OF MARYLAND.

NOSE-GUARD.

No. 857,758.      Specification of Letters Patent.      Patented June 25, 1907.

Application filed April 26, 1904. Serial No. 204,985.

*To all whom it may concern:*

Be it known that I, WILLIAM H. REISNER, a citizen of the United States, residing at Hagerstown, in the county of Washington and State of Maryland, have invented certain new and useful Improvements in Nose-Guards, of which the following is a specification.

My invention relates to nose guards for eyeglasses and spectacles.

The object of my invention is to produce devices falling within the class named, and having special construction and arrangement with the intent of providing considerable bearing surfaces that come into direct contact with the nose of the wearer and support the eyeglass, those bearing surfaces being equipped with contrivances of particular formation and operation by means of which a secure grasp of the flesh of the nose is attained to insure them against displacement.

It is also an object of my invention to fashion eyeglass attachments of the nature and purpose stated, which, while exerting a sufficient clasping action upon the nose of the wearer, cause no abrasion or marking of the skin as the result of continued use.

I accomplish the objects set forth by forming and associating the elements as illustrated in the accompanying drawings, of which Figure 1 represents a perspective view of one lens of an eyeglass with my invention applied. Fig. 2 is a front view in perspective of one of the twin guards alone, and Fig. 3 is a rear view in perspective of the same part. Fig. 4 shows a longitudinal section of the guard detached. Fig. 5 is an explanatory partly sectional side view introduced to illustrate the peculiar manner in which the guard grasps the side of the nose.

All the views are drawn upon a scale greater than actual size to more clearly exhibit the construction and arrangement, and like letters refer to like parts throughout the drawing.

Each constituent element is described in detail and its individual office, together with the mode of operation of the whole, fully explained hereinbelow.

Considering the drawings, letter A designates a lens of any pair of eyeglasses or spectacles. For purposes of this description I have shown part of an eyeglass having the customary lens clamp B and supporting post C, provided with the recessed block D, in the recess, *d*, of which the ends of the bow spring E are situated in the ordinary manner.

The body and main bearing plate of the guard or attachment constituting my invention is marked F, and the surface of the body portion presented in Fig. 2 affords the principal bearing surface of the guard. At its upper end the body of the guard is continued into an annular auxiliary bearing plate G. Within the annular bearing plate G is situated a circular presser plate H which is provided with a central, usually conoidal, depressed portion *h*, to be again mentioned. Presser plate H forms the head of a spring tail or shank J, that merges into the body F when the parts are die-stamped from a single piece of sheet metal as is usually the case, and as drawn herein, but, it is believed to be within the scope of my invention to secure the spring tail J to the body in any desired way that will permit placing plate H within the annular plate G as desired and described. It will be noted in all the figures of the drawing that the annular auxiliary plate G is slightly inclined rearwardly with respect to the body F, and that the presser plate H lies in the same inclined plane.

At one side the body F is provided with the bent and curving arm K, and the end of the arm is formed to occupy the recess in block D, wherein it is secured by the same screw, L, which holds the extremity of bow spring E in position.

The operation of my invention is best explained in connection with an inspection of Fig. 5. It will be borne in mind that the entire surfaces throughout the body F and auxiliary annular plate G rest against the flesh of the nose of the wearer, and in that manner a total bearing surface of considerable extent is afforded. When a ring-like surface such as plate G is pressed against the nose, that portion of the yielding flesh within the ring will relatively rise and even protrude slightly. It will be noted here that the face of plate H is pressed outwardly through the annular portion G. That is to say, when the annular surface G rests against the nose, the face or front portion of plate H is not in the same plane with the surface G, but has been pressed outwardly and lies in another plane. Now, the spring operated presser plate H exerts upon the edges of the encircled flesh, indicated by the letter X, a spreading effect, practically clamping those edges between itself and the interior edge of the annular plate G. At the same time, the depressed portion $h$ of the presser plate acts in a degree as the device vernacularly termed a "sucker plate." That is to say, a portion of air is expressed by the application of the presser plate and a partial vacuum formed in the depressed portion $h$ which aids in resisting the displacement of the glasses by external air pressure. The grasp upon the nose attained by the various parts and their concerted action as explained, while secure, is, nevertheless, of such gentle and distributed character as to cause no abrasion or soreness however continuously the glasses may be worn.

Having thus described my invention and the mode of its operation, what I claim is—

1. In a nose guard, a main bearing plate comprising a straight portion and an annular end portion together affording a main bearing surface arranged to lie against the nose of the wearer, a presser plate arranged within said annular portion, and a spring connecting the presser plate and main bearing plate and permitting the face of the said presser plate to be pressed outwardly and away from the main bearing surface by the flesh rising within said annular portion, substantially as described.

2. In a nose guard, a main bearing plate comprising a straight portion and an inclined annular end portion together affording a main bearing surface arranged to lie against the nose of the wearer, a presser plate arranged within said annular portion, and a spring connecting the presser plate and main bearing plate and permitting the face of the said presser plate to be pressed outwardly and away from the main bearing surface by the flesh rising within said annular portion, substantially as described.

3. In a nose guard, a main bearing plate comprising a straight portion and an annular end portion together affording a main bearing surface arranged to lie against the nose of the wearer, a presser plate arranged within said annular portion, said plate having a depression $h$, and a spring connecting the presser plate and main bearing plate and permitting the face of the said presser plate to be pressed outwardly and away from the main bearing surface by the flesh rising within said annular portion, substantially as described.

4. In a nose guard, a main bearing plate comprising a straight portion and an annular end portion together affording a main bearing surface arranged to lie against the nose of the wearer, a presser plate normally lying within said annular portion, and a spring integral with the main bearing plate and connecting the presser plate and main bearing plate and permitting the face of the said presser plate to be pressed outwardly and away from the main bearing surface by the flesh rising within said annular portion, substantially as described.

5. In a nose guard, a long, flat main bearing plate adapted to lie along the nose of the wearer and merging at its upper end into an auxiliary bearing plate slightly inclined outwardly with respect to the main bearing plate to conform to the shape of the nose, and a presser plate having a central depressed portion adapted to afford a vacuum grip arranged within the auxiliary bearing plate in substantially the plane thereof and connected to the main bearing plate by a flexible spring tongue, whereby the flesh which rises within the auxiliary bearing plate is spread to gently and securely retain the glasses in place; substantially as described.

6. In a nose guard, a long, flat main bearing plate adapted to lie along the nose of the wearer and merging at its upper end into an annular auxiliary bearing plate slightly inclined outwardly with respect to the main bearing plate to conform to the shape of the nose, and a circular presser plate having a central conoidal depressed portion adapted to afford a vacuum grip, arranged within the annular auxiliary bearing plate in substantially the plane thereof and connected to the main bearing plate by a flexible spring tongue, whereby the flesh which rises within the auxiliary bearing plate is spread and gripped to gently and securely retain the glasses in place; substantially as described.

In testimony whereof I affix my signature in presence of two witnesses.

WILLIAM H. REISNER.

Witnesses:
D. C. GILBERT,
HARRY K. MUMMA.